US011824824B2

(12) United States Patent
Sharma et al.

(10) Patent No.: US 11,824,824 B2
(45) Date of Patent: Nov. 21, 2023

(54) METHOD AND SYSTEM OF MANAGING AND DISPLAYING COMMENTS

(71) Applicant: Microsoft Technology Licensing, LLC, Redmond, WA (US)

(72) Inventors: Manoj Sharma, Winchester, MA (US); Natalie Ann Mionis, Cambridge, MA (US); Jyhyun Cho, Vancouver (CA); Simoune Rebekah Morena Valerio Lucas, Seattle, WA (US); Matthew Stephen Howard, Somerville, MA (US); Nathan Darrel Kile, Jr., Mercer Island, WA (US); Daniel John Niezgocki Chattan, Rowley, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/682,844

(22) Filed: Feb. 28, 2022

(65) Prior Publication Data

US 2023/0139570 A1 May 4, 2023

Related U.S. Application Data

(60) Provisional application No. 63/272,957, filed on Oct. 28, 2021.

(51) Int. Cl.
*H04L 51/216* (2022.01)
*H04L 51/046* (2022.01)
*H04L 51/234* (2022.01)

(52) U.S. Cl.
CPC .......... *H04L 51/216* (2022.05); *H04L 51/046* (2013.01); *H04L 51/234* (2022.05)

(58) Field of Classification Search
None
See application file for complete search history.

(56) References Cited

U.S. PATENT DOCUMENTS 8,423,088 B2 * 4/2013 Ickman ................ H04L 41/22
455/566
8,892,666 B1 * 11/2014 Jackson ............... H04L 51/216
709/206

(Continued)

OTHER PUBLICATIONS

"Comment Capsule Standardization", Retrieved From: https://web.archive.org/web/20200925132036/https://blog.hubpages.com/2017/08/14/comment-capsule-standardization/, Aug. 14, 2017, 2 Pages.

(Continued)

*Primary Examiner* — Backhean Tiv
(74) *Attorney, Agent, or Firm* — NovoTechIP International PLLC

(57) ABSTRACT

A method for generating a comment capsule for a content segment includes receiving the comment related to the content segment, receiving data associated with the comment, the data including at least one of an identifier for the content segment to which the comment relates, an identifier for a user generating the comment, and a time at which the comment was generated, generating display data for displaying the comment in a comment capsule, and transmitting the display data for displaying the comment capsule in a user interface screen associated with the content segment. The comment capsule is displayed on the user interface screen inline with the content segment, and an appearance of the comment capsule is dynamically changeable based on at least one of a number of comments received for the content segment, a size of the content segment, and a read status of the comment.

20 Claims, 10 Drawing Sheets

(56) References Cited

U.S. PATENT DOCUMENTS

| | | | | |
|---|---|---|---|---|
| 9,286,597 | B2* | 3/2016 | Rampson | G06F 40/18 |
| 9,332,315 | B2* | 5/2016 | Agrawal | H04N 21/44226 |
| 9,348,921 | B2* | 5/2016 | Collins | G06Q 50/01 |
| 9,396,490 | B1* | 7/2016 | Marx | G06Q 30/0282 |
| 9,871,757 | B1* | 1/2018 | Reardon | H04L 51/52 |
| 9,965,475 | B2* | 5/2018 | Gan | G06F 16/176 |
| 10,057,206 | B2* | 8/2018 | Naidu | H04L 51/216 |
| 10,153,996 | B2* | 12/2018 | Tevosyan | G06F 3/0482 |
| 10,397,167 | B2* | 8/2019 | Kesten | H04L 67/568 |
| 10,572,524 | B2* | 2/2020 | Kandylas | G06F 16/345 |
| 10,657,318 | B2* | 5/2020 | Vennix | G06F 3/0482 |
| 10,778,631 | B2* | 9/2020 | Chao | H04L 51/216 |
| 10,868,784 | B2* | 12/2020 | Rose | G06F 3/0485 |
| 11,068,664 | B2* | 7/2021 | Carrier | G06F 40/169 |
| 11,086,824 | B2* | 8/2021 | Kikin Gil | G06F 3/0486 |
| 11,151,086 | B2* | 10/2021 | Wilf | G06F 16/168 |
| 11,455,461 | B2* | 9/2022 | Silverstein | G06F 40/30 |
| 11,533,286 | B1* | 12/2022 | Clediere | G06F 3/04817 |
| 2012/0166453 | A1* | 6/2012 | Broder | G06F 16/9535 707/E17.104 |
| 2014/0136968 | A1 | 5/2014 | Matas et al. | |
| 2015/0229698 | A1* | 8/2015 | Swan | G06Q 10/101 709/205 |
| 2016/0072755 | A1* | 3/2016 | Su | H04L 51/216 715/753 |
| 2017/0019474 | A1* | 1/2017 | Tevosyan | H04L 51/216 |
| 2017/0139919 | A1 | 5/2017 | Ball et al. | |
| 2017/0139921 | A1* | 5/2017 | Ball | G06F 16/24578 |
| 2017/0187740 | A1* | 6/2017 | He | G06F 16/9024 |
| 2017/0206271 | A1* | 7/2017 | Jain | G06F 16/3344 |
| 2017/0302610 | A1* | 10/2017 | Naidu | H04L 51/216 |
| 2019/0129973 | A1 | 5/2019 | Truong et al. | |
| 2019/0246165 | A1* | 8/2019 | Brouwer | H04N 21/4728 |
| 2019/0325071 | A1* | 10/2019 | Rose | G06F 16/986 |
| 2019/0327197 | A1* | 10/2019 | Rose | H04L 51/216 |
| 2020/0007487 | A1* | 1/2020 | Chao | H04L 51/216 |
| 2020/0293616 | A1* | 9/2020 | Nelson | G06F 16/345 |
| 2020/0389424 | A1* | 12/2020 | Chao | H04L 51/224 |
| 2023/0139570 | A1* | 5/2023 | Sharma | H04L 51/046 709/206 |

OTHER PUBLICATIONS

"How to Create an Article Using the HubTool", Retrieved From: https://web.archive.org/web/20170306153905/https://hubpageshelp.com/content/Learning-Center-using-hubtool, Feb. 28, 2017, 27 Pages.

"International Search Report and Written Opinion Issued in PCT Application No. PCT/US22/041287", dated Dec. 14, 2022, 13 Pages.

* cited by examiner

H1 Title Here

Lorem ipsum dolor sit amet, consectetur adipiscing elit. Maecenas vitae dui imperdiet, consequat tortor vel, maximus est. Praesent tempor et justo ac interdum. Ut in magna mollis, lobortis nibh vitae, pretium libero. Suspendisse lacus enim, cursus ac est eget, molestie congue ipsum. Vestibulum dapibus nec nisi sit amet pharetra. Pellentesque nec massa enim. Vivamus eu leo quam. ● 2 ● 2 ● 2 ● Vivamus eu leo quam enim congue mol... ● ipsum suspendisse ultrices ● 2

Project Priorities

- Lorem ipsum dolor sit amet, consectetur adipiscing elit. In posuere, massa ut hendrerit vulputate, turpis arcu mattis ipsum, sit amet ullamcorper dui massa ac augue. ● 2 ● 3 ● 2 ● ipsum suspendisse ● ● ●
- Mauris luctus ullamcorper purus, vel faucibus lacus. Nullam vulputate diam et sagittis pretium. Curabitur odio leo, cursus a risus vel, pharetra ullamcorper metus. Ut non ultricies justo. ● 2
- Proin rhoncus dignissim efficitur. Nam maximus faucibus magna eu maximus.
- Nam sagittis, diam id vestibulum laoreet, urna lorem tincidunt justo, ultrices commodo odio sapien eu erat. Pellentesque habitant morbi tristique senectus et netus et malesuada fames ac turpis egestas. In in nulla justo. Proin at magna orci.

METHOD AND SYSTEM OF MANAGING AND DISPLAYING COMMENTS

CROSS-REFERENCE TO A RELATED APPLICATION

This patent application claims the benefit of priority to U.S. Provisional Application No. 63/272,957 entitled "Method and System of Managing and Displaying Comments," filed on Oct. 28, 2021, the entirety of which is incorporated herein by reference.

BACKGROUND

In today's collaborative work and social computer environments, where many users contribute to creation or consumption of content remotely, providing an avenue for users to express their thoughts and opinions about contents has become increasingly more important. Many applications enable users to express their opinions about contents in a document by providing a mechanism for the users to make a comment. For example, some applications enable the users to select a portion of contents in a document and invoke a user interface (UI) element for entering a comment associated with the selected portion. These comments are often shown on a separate portion of the UI screen as that of the content. For example, some applications display the comments on a comment pane that is displayed on the side of the screen.

When there are a large number of comments associated with a content segment or when two or more content segments that are closely spaced with each other have many comments, the result in display of the comments becomes overcrowded and confusing. In particular, it may be difficult and/or time consuming for users to determine which comments are related to which content portions. Moreover, it is often difficult for users to determine the chronological order of the comments, identify the author of each comment and/or identify comments that they should review. As a result, interactions with comments may become time consuming, inefficient, and unpleasant.

Hence, there is a need for improved systems and methods of managing and displaying comments associated with a content segment.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 2A-2C depict example user interface screens of an application an application that provides comment management services.

FIGS. 3A-3B depict example UI screens for displaying comments.

SUMMARY

Figure 1A:
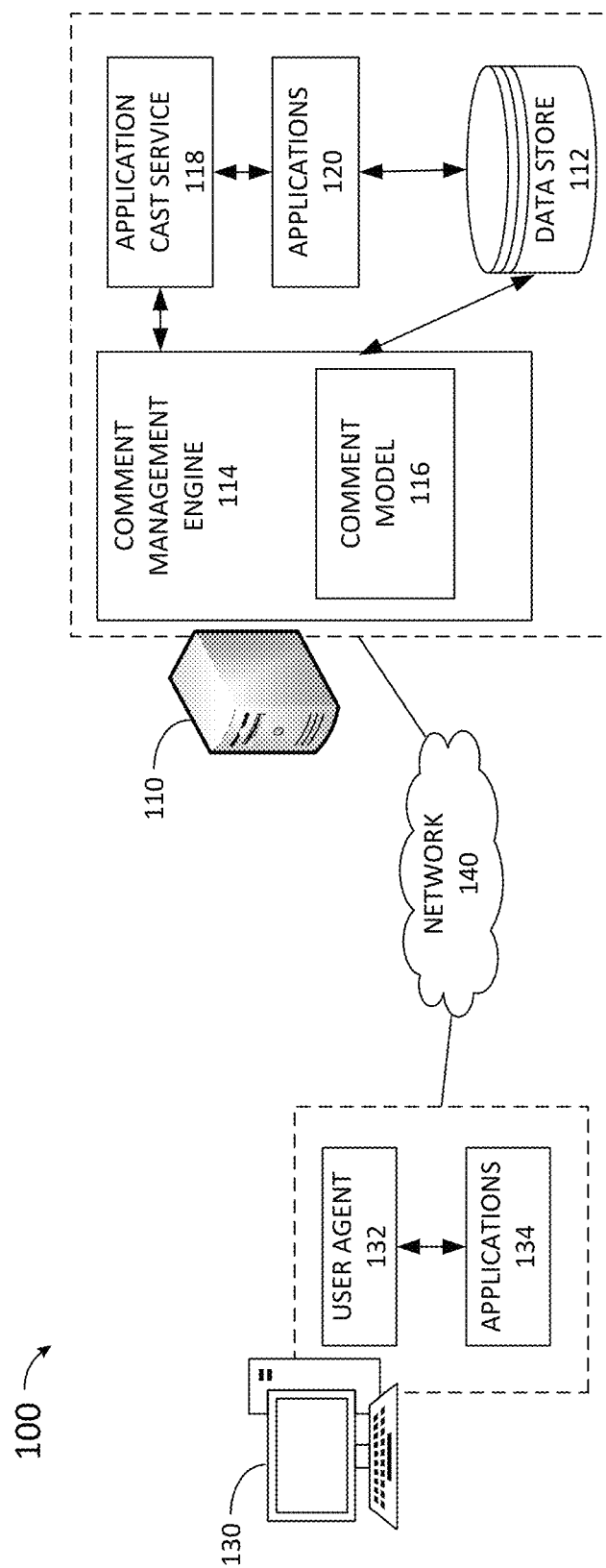
FIG. 1A depicts an example system upon which aspects of this disclosure may be implemented.

In one general aspect, the instant disclosure presents a data processing system having a processor and a memory in communication with the processor wherein the memory stores executable instructions that, when executed by the processor, cause the data processing system to perform multiple functions. The function may include receiving a comment related to a content segment, receiving data associated with the comment, the data including at least one of an identifier for the content segment to which the comment relates, an identifier for a user generating the comment, and a time at which the comment was generated, generating display data for displaying the comment in a comment capsule, and transmitting the display data for displaying the comment capsule in a user interface screen associated with the content segment. The comment capsule is displayed on the user interface screen inline with the content segment, and an appearance of the comment capsule is dynamically changeable based on at least one of a number of comments received for the content segment, a size of the content segment, and a read status of the comment.

In yet another general aspect, the instant disclosure presents a method for generating a comment capsule for a content segment. In some implementations, the method includes receiving the comment related to the content segment, receiving data associated with the comment, the data including at least one of an identifier for the content segment to which the comment relates, an identifier for a user generating the comment, and a time at which the comment was generated, generating display data for displaying the comment in a comment capsule, and transmitting the display data for displaying the comment capsule in a user interface screen associated with the content segment. The comment capsule is displayed on the user interface screen inline with the content segment, and an appearance of the comment capsule is dynamically changeable based on at least one of a number of comments received for the content segment, a size of the content segment, and a read status of the comment.

In a further general aspect, the instant application describes a non-transitory computer readable medium on which are stored instructions that when executed cause a programmable device to perform function of receiving a comment related to a content segment, receiving data associated with the comment, the data including at least one of an identifier for the content segment to which the comment relates, an identifier for a user generating the comment, and a time at which the comment was generated, generating display data for displaying the comment in a comment capsule, and transmitting the display data for displaying the comment capsule in a user interface screen associated with the content segment. The comment capsule is displayed on the user interface screen inline with the content segment, and an appearance of the comment capsule is dynamically changeable based on at least one of a number of comments received for the content segment, a size of the content segment, and a read status of the comment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Commenting on content has become an increasingly useful tool in collaborative work environments. For example, users, who are working on the same document from different geographical locations and/or at different times, may pose questions, express their opinions and/or suggest edits for one or more segments of the content in a document. In another example, a viewer reviewing a work product may comment on various segments of the work product. To generate a comment, the user can often utilize a feature (e.g., menu button) of the application associated with the document to provide their input, which will then be displayed on the document.

The comment is normally displayed in a manner that depicts the association between the comment and the content segment to which it relates. To achieve this, current mechanisms for displaying comments often utilize a separate portion of the UI screen for displaying comments. For example, a comment pane may be displayed on the right side of the screen that displays all the comments for the content shown in the UI screen. This keeps the content separate from the comments. While such a mechanism may operate well when there are only a few comments, this manner of displaying comments often results in an overcrowded and confusing display of comments when there are many comments. This often results in the comments pane becoming difficult to review. Moreover, when there are a large number of comments, it is often difficult to identify associations between the comments and the content segments. As such, there exists a technical problem of lack of adequate mechanisms for displaying comments in a clear and understandable manner.

Moreover, current mechanisms for displaying comments do not provide a manner in which the user can determine if there are new comments that they have not yet reviewed. Furthermore, users may be required to click on multiple UI elements to determine if a comment has any replies, identify the author(s) of the replies and/or determine if the comment includes content that they are interested in. Additionally, displaying comments on a separate portion of the UI screen often requires a significant amount of space. As such, there exists another technical problem of lack of mechanisms for displaying comments in a manner that is user-friendly, easy to understand and follow, and/or does not take a lot of screen space.

To address these technical problems and more, in an example, this description provides technical solutions for generating dynamically shaped, sized and placed comment capsules that are displayed inline with the content segments to which they relate. Each comment capsule may be displayed on the canvas and below the content segment the comment capsule is anchored to. The shape and/or size of the comment capsule may be changeable based on a number of parameters such as the size and/or location of the content segment, number of comments associated with the content segment, the time/date at which the comment was received (e.g., newness of the comment) and/or space constraint of the UI screen. In some implementations, the comment capsule is dynamically resized as needed. The comment capsule may display an identifier for the user who made the comment (e.g., profile picture or name). Depending on the number of comments received and/or the amount of UI screen space available, the comment capsule may display the first few characters or more of the comment. In some implementations, when the size of the comment capsule is reduced, the comment capsule resembles a comment icon. To ensure that the most relevant comments are shown to a user, the comment capsule may be dynamically updated so that its' shape, size and/or content corresponds with the latest needs of the user and/or application. In some implementations, a comment capsule may include an indicator that shows the comment is unread. Moreover, the comment capsules may be displayed in a manner that allows the user to expand the content of the comment capsule and/or display more comment capsules. The user may also be able to collapse one or more comment capsule into a collapsed state that takes less space, as needed. In this manner, the technical solutions save UI screen space and increases user efficiency.

As will be understood by persons of skill in the art upon reading this disclosure, benefits and advantages provided by such implementations can include, but are not limited to, a technical solution to the technical problems of lack of adequate mechanisms for displaying and managing comments in a clear, concise and user-friendly manner. Technical solutions and implementations provided herein offer a mechanism for generating and displaying dynamically changeable comment capsules inline with the content segments to provide clear association between the comments and the content segments they are associated with. Moreover, the appearance of the comment capsule can dynamically change depending on the needs of the user and/or space availability of the UI screen to ensure that UI screen is used efficiently, while providing mechanisms for the user to interact with, expand and/or collapse the comment capsules as needed. The benefits made available by these technology-based solutions provide a user-friendly mechanism for displaying and managing comments that efficiently utilizes screen space.

FIG. 1A illustrates an example system 100, upon which aspects of this disclosure may be implemented. The system 100 may include a server 110 which may be connected to or include a data store 112 which may function as a repository in which datasets relating to training models, data relating to comments, documents and/or applications 120 may be stored. Although shown as a single data store, the data store 112 may be representative of multiple storage devices and data stores which may be connected to each of the various elements of the system 100. Moreover, the server 110 may include a plurality of servers that work together to deliver the functions and services provided by each service or application. The server 110 may operate as a shared resource server located at an enterprise accessible by various computer client devices such as client device 130. The server may also operate as a cloud-based server for offering comment management services in one or more applications such as applications 120 and/or applications 134.

The server 110 may include and/or execute a comment management engine 114 which may provide comment management services for users utilizing an application on their client devices such as client device 130 or for applications 120. The comment management engine 114 may operate to examine comments received from a user's client device via an application (e.g., applications 120 or applications 134), examine the comments, analyze data relating to the document for which the comments were provided such as screen space, examine previously received comments for the document and/or content segment to which the comment is related and determine how the comment should be displayed on the document based on one or more of the examined data.

The comment management engine 114 may include one or more machine learning (ML) models such as comment model 116 that receives data relating to comments and contextual data, analyzes the received data and determines how the comment capsules should be displayed in a document. For example, the comment model 116 may determine the size of the comment capsule or the order in which the comment capsules should be displayed.

As a general matter, the methods and systems described herein may include, or otherwise make use of an ML model to analyze various parameters relating to comments in a document and determine an appropriate appearance, order, and position for displaying comment capsules in the document. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity, determine associations between various roles and people, mentions and other explicit signals to imply relevance, frequency of interaction between people and the like to help determine appropriate appearance and locations for comment capsules. Such training may be made following the accumulation, review, and/or analysis of data (e.g., user data) over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

In some implementations, the training mechanism used to train the ML models used by the comment management engine 114 may use training datasets stored in the data store 112 or at other locations to provide initial and ongoing training for the models. In one implementation, the training mechanism may use labeled training data from the data store 112 (e.g., stored user input data) to train each of the models via deep neural networks. The initial training may be performed in an offline stage.

The client device 130 may be connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user to interact with various applications (e.g., applications 120 or applications 134). Examples of suitable client devices 130 include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail in regard to FIGS. 5 and 6.

The client device 130 may include one or more applications 134. Each application 134 may be a computer program executed on the client device that configures the device to be responsive to user input to allow a user to view, edit, and prepare content, and/or provide and review comments for a document or other type of content. User data from applications 134 may be provided via the network 140 to the comment management engine 114, either directly or via the application cast service 118, for processing. In some implementations, the applications 134 includes a local comment management engine for local processing and management of comments. Examples of suitable applications include, but are not limited to a fluid collaborative work environment (e.g., Microsoft® Loop), productivity application (e.g., Microsoft® Word, etc.), presentation application (e.g., Microsoft® PowerPoint®), a document editing application, communications application (e.g., Microsoft® Teams®), and the like.

In some examples, applications used to enter and display comments are executed on the server 110 (e.g., applications 120) and are provided via an online service. In some implementations, web applications communicate via the network 140 with a user agent 132, such as a browser, executing on the client device 130. The user agent 132 may provide a user interface that allows the user to interact with applications 120 and may enable applications 120 to provide comment data to the comment management engine 114 for processing via the application cast service 118. In other implementations, the applications 120 may directly communicate with the comment management engine 114. In some implementations, the comment management engine 114 may be included in the applications 120.

Figure 1B:
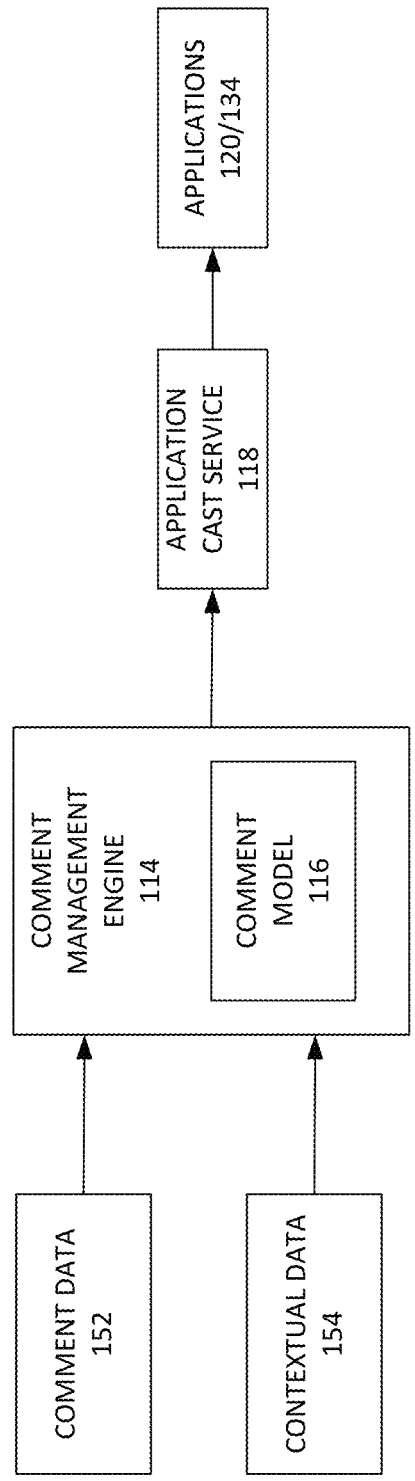
FIG. 1B depicts an example data flow between some elements of an example system upon which aspects of this disclosure may be implemented.

FIG. 1B depicts an example data flow between some of the elements of the example system 100. In some implementations, the comment management engine 114 receives comment data 152 and contextual data 154. The comment data may be received from a data storage medium that stores the document associated with comment(s) or may be received from applications 120/134. In some implementations, after a comment is received for a document and the comment is saved, comment data 152 is stored along with the content of a document. The comment data 152 may include content of the comment (e.g., alpha numeral text, emoticons, multimedia data, characters and the like), an identifier for the user who provided the comment (e.g., user ID), an identifier for the content portion to which the comment relates (e.g., a paragraph ID, sentence ID, table ID, image ID, etc.) and/or a date/time at which the comment was received. Some of this comment data may be stored as metadata along with the document contents when the document is stored. When a new comment is received for a document, data associated with the comment may be transmitted by the applications 120/134 or the application cast service 118 to the comment management engine 114 for processing and display.

In addition to the comment data 152, the comment management engine may also receive contextual data 154. The contextual data 154 may include contextual data about the document and/or user(s) associated with the document. For example, the contextual data 154 may include information about the size of the content segment to which a comment is related, the available space on the UI screen for displaying comments, comment history preferences for the user viewing the comments (e.g., the user often collapses all comments expect for new comments). In some implementations, the contextual data 154 may also include user specific data for users associated with the document. For example, the contextual data 154 may include information about the relationship between the user viewing the document and other users (e.g., users who have submitted comments for the document). This information may be retrieved from an organization graph (e.g., data relating to employees in an organization such as their roles and their associations with each other) and may help determine the order at which comments or new comments are displayed for content segments. For example, comments submitted by users who have a close association with the current user (e.g., the user's manager) may be displayed before other comments. The contextual data 154 may also include data relating to relevant activities performed by the user or other users with respect to the document or user history of activities or interactions with similar content. Furthermore, the contextual data 154 may include data relating to frequency of interaction with the document, content segment or other similar content by both the user and/or users associated with the user or users who are identified as having similar characteristics as the user. The contextual data 154 may also include data such as user identifiers (e.g., user profile pictures) that can be displayed on comment capsules to identify the author of a comment.

The comment management engine 114 may provide the received comment data 152 and contextual data 154 to the comment model 116 for processing. It should be noted, however, that in some implementations, the comment management engine 114 processes the received data without the user of an ML model. The comment model 116 or comment management engine 114 may examine the received data to determine the appropriate appearance, order, and/or state (e.g., collapsed or expanded) of the comment capsules displayed on the document. For a newly received comment, the comment model 116 may determine how and where a comment capsule should be displayed for the comment. The appearance of the comment capsule may be dynamically changed based on the content of the UI screen. For example, when a user begins adding or deleting content for a content segment for which one or more comment capsules are displayed, the change in size of the content segment may necessitate a change in the appearance of the comment capsules. In an example, when more content is added to the content segment, thus decreasing the amount of screen space available, one or more comment capsules may be decreased in size or collapsed to accommodate the increased sized content segment. In another example, the size of the displayed comment capsule may be decreased when more comments are added to the content segment. When a comment capsule is decreased in size, the number of characters of the comment displayed in the comment capsule preview may be reduced. For example, while initially the comment capsule preview may display the first 5 words of the comment, a reduced sized comment capsule preview may display only the first 2 words of the comment.

In addition to determining the appearance, order and state of the comment capsules, the comment management engine 114 and/or comment model 116 may also determine if each comment is read or unread by the user. This may be achieved by collecting, storing and/or retrieving data relating to read status of comment capsules. This information may be collected by the application 120/134 as the user interacts with comments in a document. For example, when the user clicks on a comment capsule to expand it, that interaction may be stored as being indicative of the user reading the comment capsule. A read flag associated with the comment capsule may then be changed from an unread status to a read status for the particular user. This data may be stored as metadata with the document. In alternative implementations, comment capsule status data may be stored in a separate data structure. A comment capsule read status flag may be created each time a new comment capsule is generated. The comment capsule read status flag may store separate flags for each user that reviews the document/content associated with the commend capsule. The comment capsule read status data may then be retrieved and examined when the content is being displayed for a user, so that the appearance of each comment capsule can be dynamically changed for each user based on the user's interactions with the comment capsules.

When the comment capsule read status identifies a comment as being unread for a given user, the comment management engine 114 may retrieve this information and use it to display an unread indicator on the comment capsule when the comment capsule is displayed to the user. In some implementations, the comment management engine 114 and/or comment model 116 may display an unread indicator on the comment capsule, when one or more of the replies to the comment are unread by the user.

The comment management engine 114 and/or comment model 116 may also identify comments that include replies, identify the authors of the reply and include identifiers (for the reply authors (e.g., profile pictures, names, etc.) to be displayed on the comment capsule. For example, when a comment has two replies, the comment capsule may display the picture of the comment's author as well as the pictures of the two reply authors. Furthermore, comment management engine 114 and/or comment model 116 may determine the order in which comment capsules should be displayed for a content segment. The order may be chronological based on the time/date at which each comment is received. In some examples, newer comments are shown first before older comments. In other examples, the order begins with the oldest comment and moves chronologically to the newest comment. In some implementations, the order is determined based on the preferences and/or needs of the user. For example, comments that are determined to be more relevant to the user may be displayed first. More relevant comments may include comments that are directly related to the user (e.g., comments by the user or comments for which the user provided a reply), comments by users that have a relationship to the user, and/or comments that have subject matters that may be relevant to the user. In some implementations, unread comments are displayed first. Relevance of the comment to the user may be determined by the comment model 116 and may be calculated by receiving contextual data 152, comment data 154 and user data as inputs and calculating a relevance score for each comment capsule based on the received data. The comment capsules may then be sorted and displayed according to their relevance scores.

Once the appearance, order, and/or location of comment capsules for a document or document portion (e.g., current screen) are determined, the comment management engine 114 may generate data (e.g., display data) associated with the determined appearance, order, and/or location and may provide the generated data to the application cast service 118 which may in turn provide the results to the applications 120/134 for display to the user. In some implementations, the comment management engine 114 may transmit the display data directly to the applications 120/134.

Figure 2A:
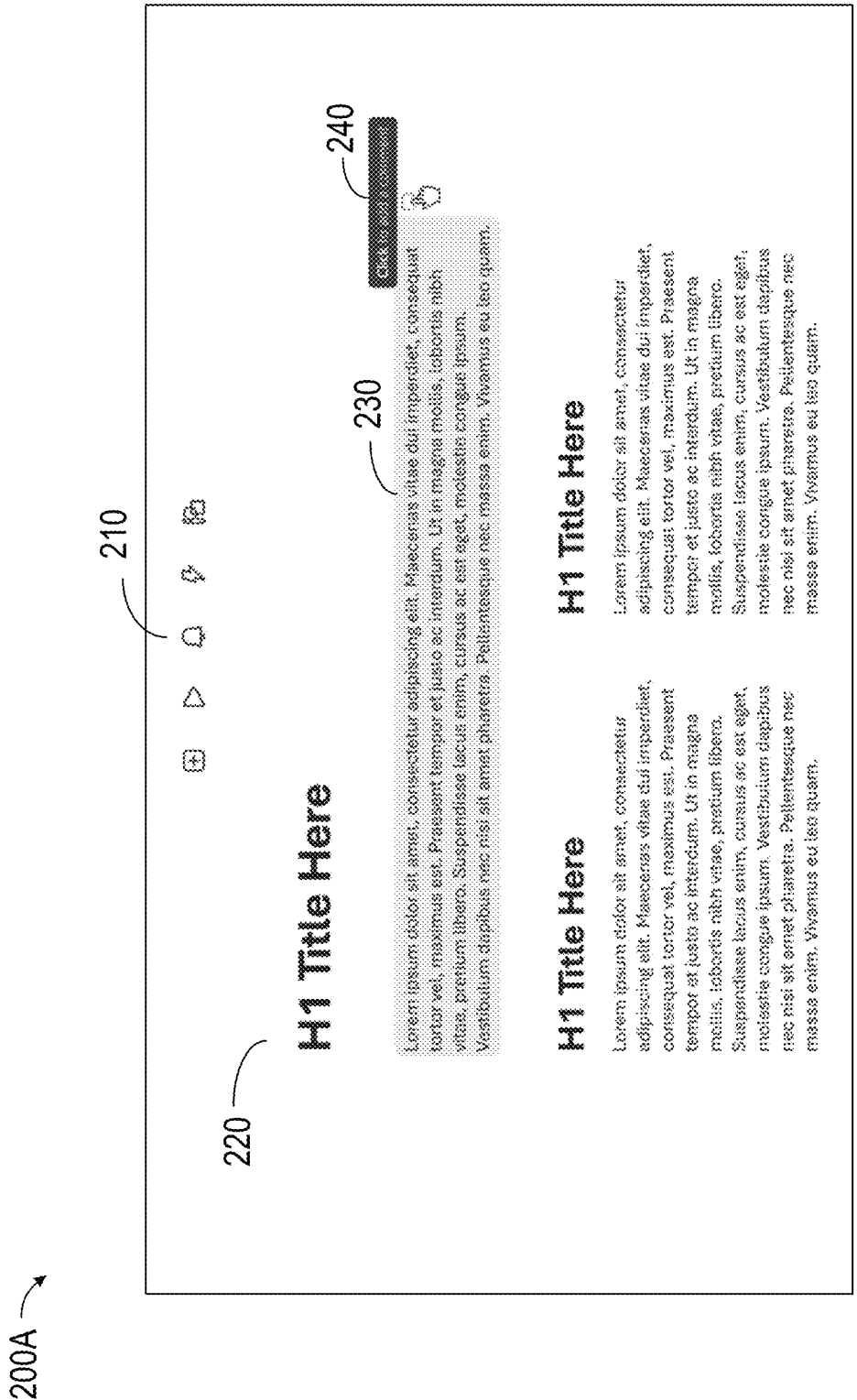
Figure 2C:
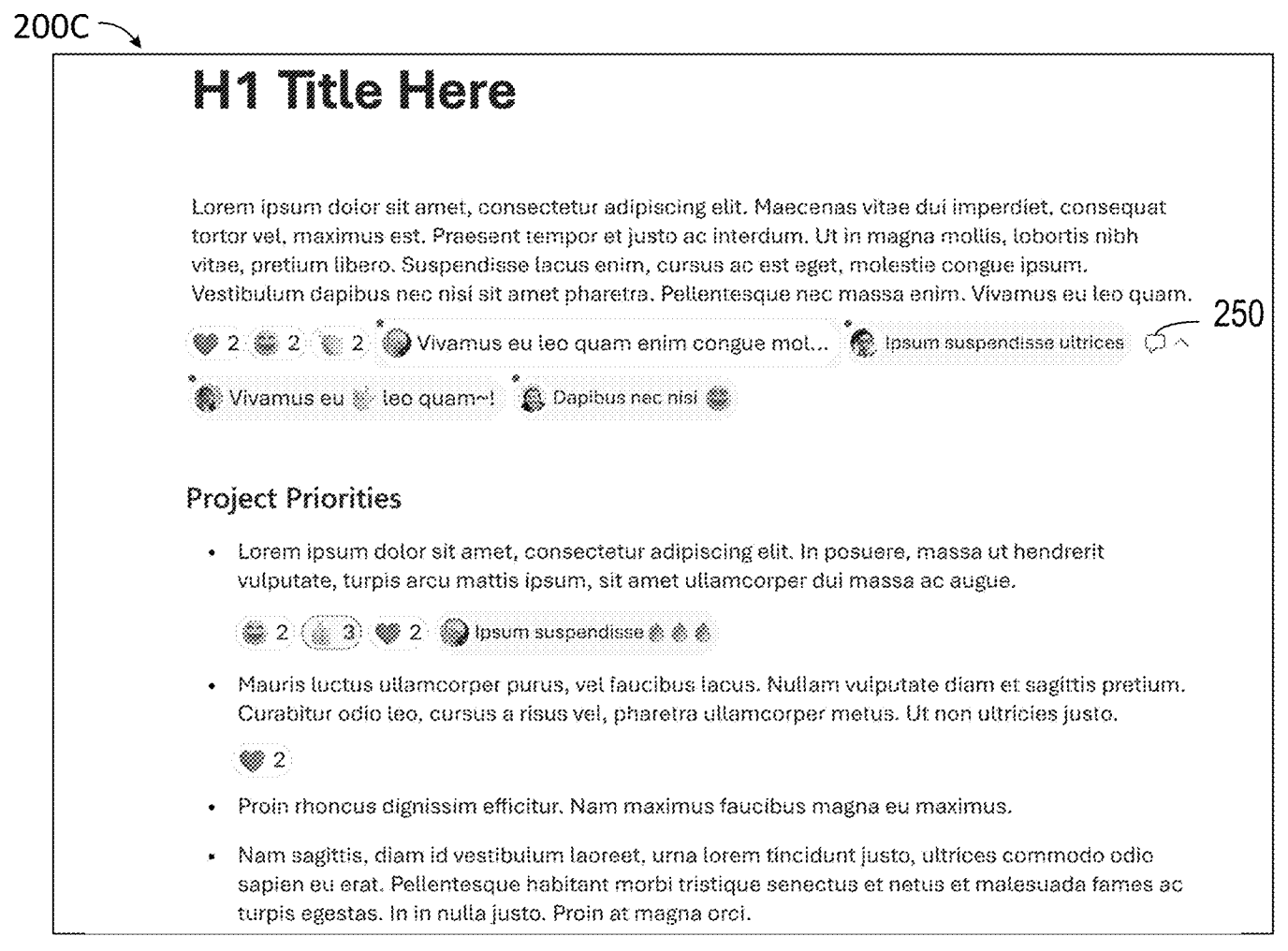

FIG. 2A-2C depict example UI screens for an application that provides comment management services. The UI screen 200A of FIG. 2A may for example be displayed by a fluid collaborative work application that allows users to generate documents that include many different types of content (e.g., text, tables, multimedia content, etc.). In an example, the UI screen 200A of the application may include a toolbar menu 210 that may display multiple menu options for providing various application features. The UI screen 200A may also include a content pane 220 which may contain one or more content segments. Each content segment may include a type of content. The size of each content segment may vary depending on the length of the content.

The user may be able to select a content segment or a portion of a content segment to add a comment. To select the content segment, the user may be able to click and drag a pointer to highlight the selection. In some implementations, the content segment is selected when the user utilizes a pointer to hover over a content segment. The selection may be for an entire content segment such as the content segment 230 or it may be a portion of the content segment (e.g., one or two sentence of a paragraph). Once a selection is made, the selected portion may be highlighted to indicate the selection. Other methods of selecting a content segment may also be utilized.

After a content segment is selected, a UI element such as the UI element 240 may be automatically displayed on the UI screen 200A to enable the user to add a comment if desired. In alternative implementations, a UI element for adding a comment may be displayed in a context menu (e.g., upon right-clicking on the selected content segment). Other mechanisms for invoking the display of the UI element 240 may also be utilized. Once the UI element 240 is displayed, the user may initiate adding a comment to the content segment 230 by clicking on the UI element 240.

Upon clicking on the UI element 240, a UI element for entering an input may be displayed on the UI screen 200A. The UI element may be an expandable input box that allows the user to enter characters, emoticons and/or other types of input data into the box. Once the user is finished entering the data, they may be able to utilize a menu option (e.g., a menu button for submitting the comment or pressing enter) to add their comment to the content segment 230. The received input may then be associated with the selected content segment 230 as a comment and displayed as a comment capsule.

FIG. 2B illustrates an example UI screen 200B of a document after two content segments on the UI screen have received comments. As depicted, submitted comments may be displayed by comment capsules such as comment capsules 244 and 246 that are positioned adjacent to and below the content segment to which they are anchored. The number and size of each comment capsule may depend on the size of the content segment and/or space availability of the UI screen. When a content segment such as the content segment 230 has more comment capsules that can be displayed in one line, some of the content segments may be collapsed and depicted by a comment icon 250. The comment icon 250 may display the number of collapsed comment capsules (e.g., 2).

An indicator 260 may be displayed adjacent to each comment icon or comment capsule that includes unread comments. As depicted in UI screen 200B, the indicator 260 may be a small colored dot. In an example, the indicator 260 is a blue colored dot. Any other color may be used. Other types of indicators may also be utilized. In an example, the color of the comment icon 250 or comment capsule that includes unread comments may be changed to indicate it includes unread comments. The unread indicator may continue being displayed on the comment icon 250 or an unread comment capsule until the comment is expanded or selected by the user.

Each of the comment capsules 244 and 246 may include an identifier (e.g., identifier 242 and identifier 244) for identifying the author of the comment. The identifier may be a picture of the author. In alternative implementations, the identifier may be a first name, full name, initials, or other types of information that identifies the author. Each comment capsule may provide a comment preview by displaying a few first words or first characters of the comment. The number of characters shown may vary depending on the number comment capsules and the screen size availabilities of the UI screen.

To view a comment in full, the user may be able to select a comment capsule (e.g., click on the comment capsule). Upon selection, the entire content of the comment capsule may be displayed in a pop-up menu. In some implementations, if a comment has received replies, the replies may also be displayed on the same pop-up menu. In an example, instead of displaying a pop-up menu, the comment capsule may be expanded to display the full comment on the UI screen. The full comment capsule may be overlayed on the content of the UI screen 200B. When the user is done reviewing the comment, they may utilize a UI element to collapse the comment capsule such that it does not interfere with the content of the UI screen 200B. Additionally or alternatively, the comment capsule may enable automatic scrolling text interaction within the comment capsule. The automatic scrolling may be initiated by hovering a pointer over the comment capsule or by tapping on the comment capsule (e.g., for mobile devices). This may prevent additional context changes for the user, while providing the comment content in a small space afforded by the comment capsule.

To display the collapsed comments, a user may be able to click on the comment icon 250. Upon selection of the comment icon 250, the collapsed comments may be expanded to display additional comment capsules as depicted in the UI Screen 200C of FIG. 2C. Once the collapsed comments are expanded, the appearance of the comment icon 250 may change. For example, the comment icon 250 may no longer show the number of collapsed comments. Additionally, the unread indicator may no longer be displayed next to the comment icon 250. Instead, the unread indicator may be displayed adjacent to each of the comment capsules that contain unread content. To collapse the comments again, the comment icon 250 may be selected.

Figure 3A:
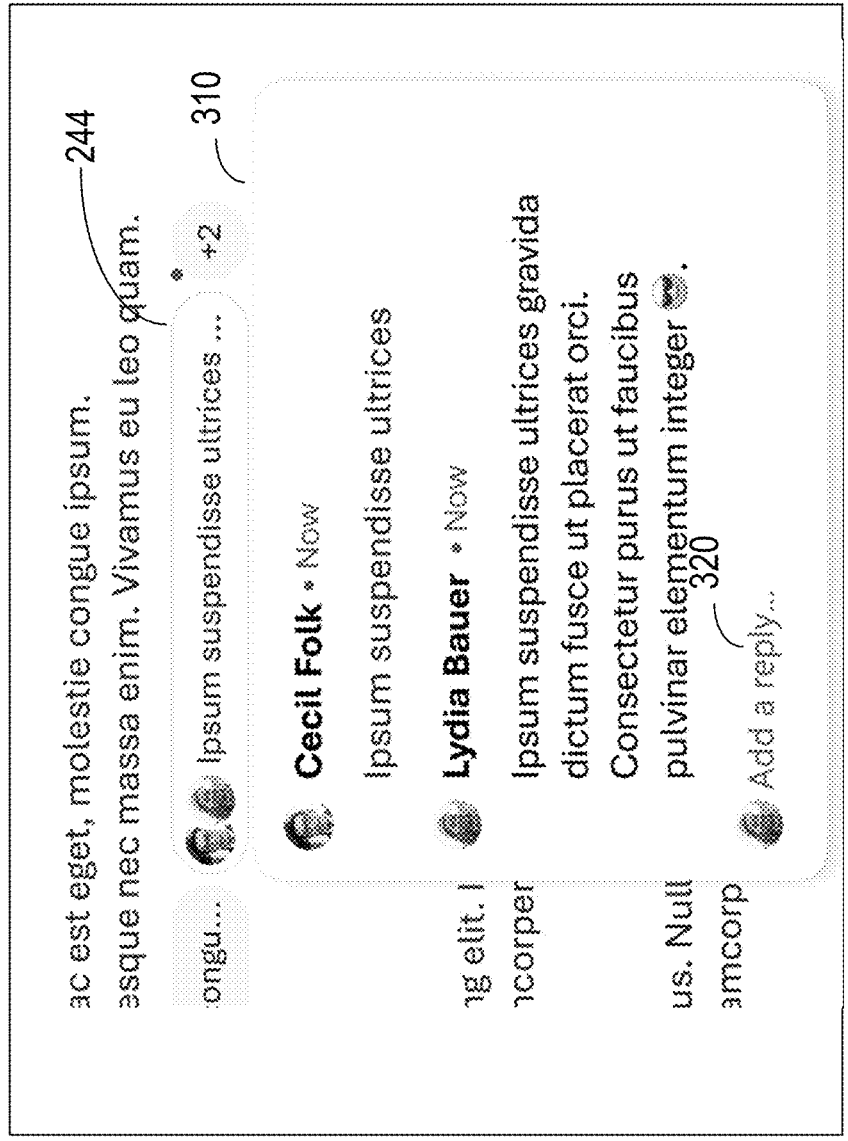
Figure 3B:
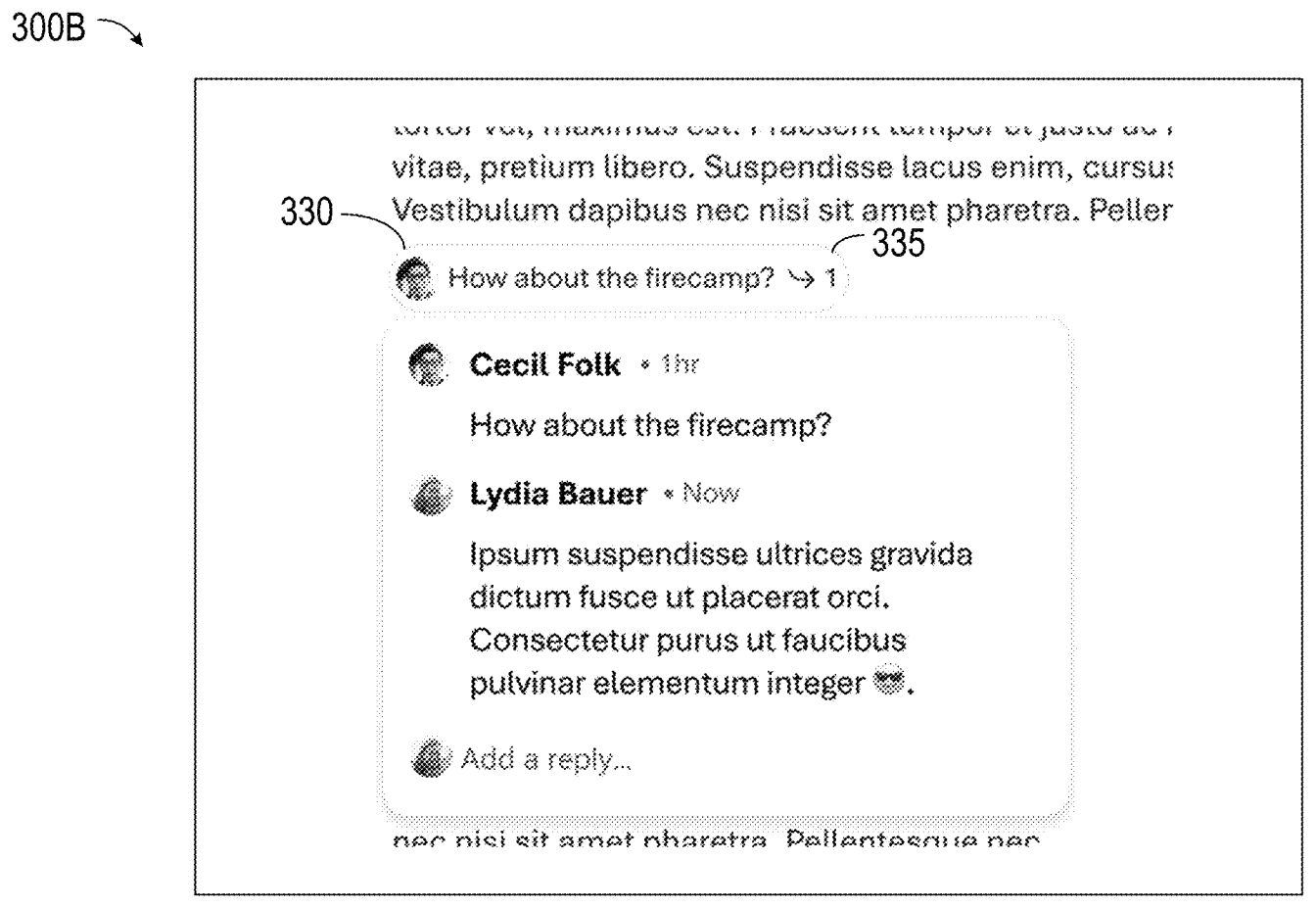

FIGS. 3A-3B depict example UI screens for displaying comments. The UI screen 300A of FIG. 3A displays how each comment capsule may be expanded to display the content of the comment capsule. When the user selects a comment capsule such as the comment capsule 246, the UI element 310 may be displayed that depicts the content of the comment. The content may include the original comment and any replies to the original comment. The UI element 310 may display each comment and reply on a separate portion to distinguish between a comment and its' one or more replies. An identifier for the author of each comment may be displayed adjacent to the comment. The identifier may include a profile picture as well as the name of the author. Furthermore, a time/date may be displayed next to each comment to indicate when the comment was received. The UI element 310 may also include an input box 320 for entering a reply to the original comment or to one of the replies. As depicted, when a comment capsule includes a reply, the comment capsule may display an identifier (e.g., picture) for the author of the original comment and a separate identifier for the author of one or more replies. In an example, replies may include an identifier that distinguishes the reply from an original comment.

In some implementations, the comment capsule preview includes an indicator to notify the user that the comment includes replies. This is depicted in UI screen 300B of FIG. 3B in which the comment capsule 330 includes the indicator 335. This enables the user to quickly identify comments that include replies and may assist the user in deciding which comment capsules to expand and review. In addition to the indicator 335, the comment capsule 330 may also display the number of replies associated with the comment capsule. For example, the number 1 is displayed adjacent to the indicator 335 to indicate that the comment capsule 330 has one reply. In some implementations, when a comment includes replies, the author identifier (e.g., picture) for the comment capsule is changed to the author of the reply. In another example, the preview content of the comment capsule (e.g., first few characters of the comment capsule) is changed to the content of the latest reply. In this manner, the appearance and preview content of the comment capsule may change dynamically as changes are made to the comments to provide the latest information to the user.

In some implementations, the comment capsule displays an indicator for specific types of data (e.g., video data, emoji reactions, animated GIFs, and the like) which may be exposed by expanding the comment capsule. For example, if the comment includes video data and/or if the comment is a video comment, the comment capsule may display an indicator for the video and/or the duration of the video in a collapsed state or within the first few characters of the comment capsule. The user may then be able to interact with the video and launch the video directly from the collapsed comment capsule without expanding the comment capsule.

Figure 4:
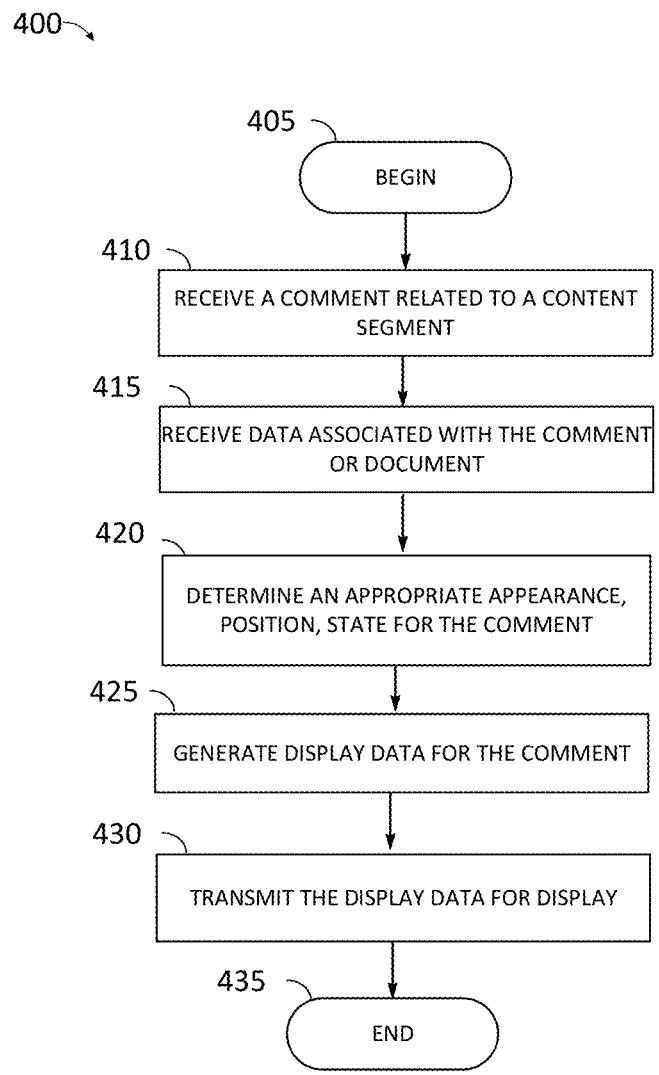
FIG. 4 is a flow diagram depicting an example method for managing and displaying comments associated with a content segment in a document.

FIG. 4 is a flow diagram depicting an exemplary method 400 for managing and displaying comments associated with a content segment in a document. One or more steps of the method 400 may be performed by a comment management engine such as the comment management engine 112 of FIGS. 1A-1B. The method 400 may begin, at 405, and proceed to receive a comment related to a content segment in a document, at 410. This may occur, for example, when a user submits a comment via a UI of an application or service that provides comment display and management services. The comment may be provided via an input/output element of a client device and be transmitted via a network to a comment management engine. The document may be any electronic document that includes content. The content segment may be any portion of the content for which a comment can be submitted. In some implementations, the method 400 may be initiated when a modification is made to content of the document. For example, when more content is added, thus changing the available screen space, or when one or more comments are added or deleted.

Once the comment is received and/or retrieved, method 400 may proceed to receive or retrieve data associated with the comment, at 415. The data may include data about the comment such as an identifier for the author, the time/date the comment was received, and/or the content segment to which the comment is related. Furthermore, the data may include contextual data about the document, data about the user and/or any other data or information that may be used to determine how to display the comment.

Once the required data has been received, method 400 may proceed to determine an appropriate appearance, position and/or state for a comment capsule depicting the comment, at 420. This may involve the use of an ML model and may include determining an appropriate size for the comment capsule based on the number of comment capsules associated with the content segment, the amount of available screen space, the size of the content segment and/or other parameters. Furthermore, determining an appropriate appearance may include determining if a profile picture for the author should be displayed on the comment capsule and/or whether an unread indicator should be depicted next to the comment capsule. This may also involve determining the order of comment capsules when more than one comment capsule has been submitted for the content segment. Furthermore, this step may include choosing a collapsed or expanded state for the comment capsule. For comments that include replies, a determination may also be made as to whether an indicator should be displayed on the comment capsule that indicates the comment includes one or more replies.

Once the appropriate appearance, position, state and/or order of comment capsules have been determined, method 400 may proceed to generate display data for displaying the comment capsule, at 425. The display data may include the content of the comment, as well as data relating to the size of the comment capsule, the number of first few characters that should be displayed, author identifier information, the order at which the comment capsule should be displayed, and/or data indicating whether an unread indicator should be displayed for the comment capsule.

Once the required display data is generated, method 400 may proceed to transmit the generated data for display, at 430. This may involve transmitting the display data from the comment management engine to the application displaying the document for processing and rendering by the application. When the display data is transmitted, method 400 may end at 435.

Figure 5:
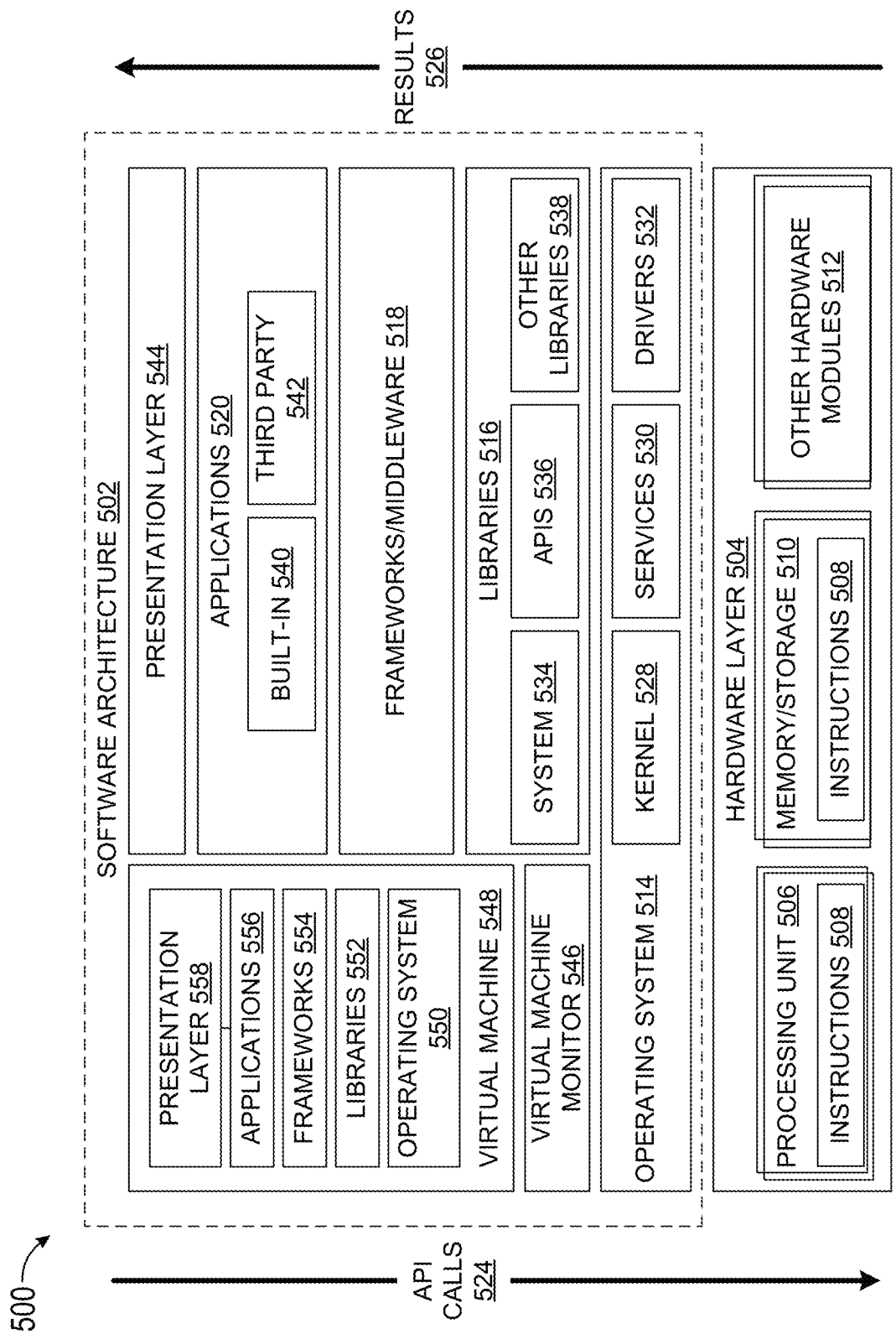
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
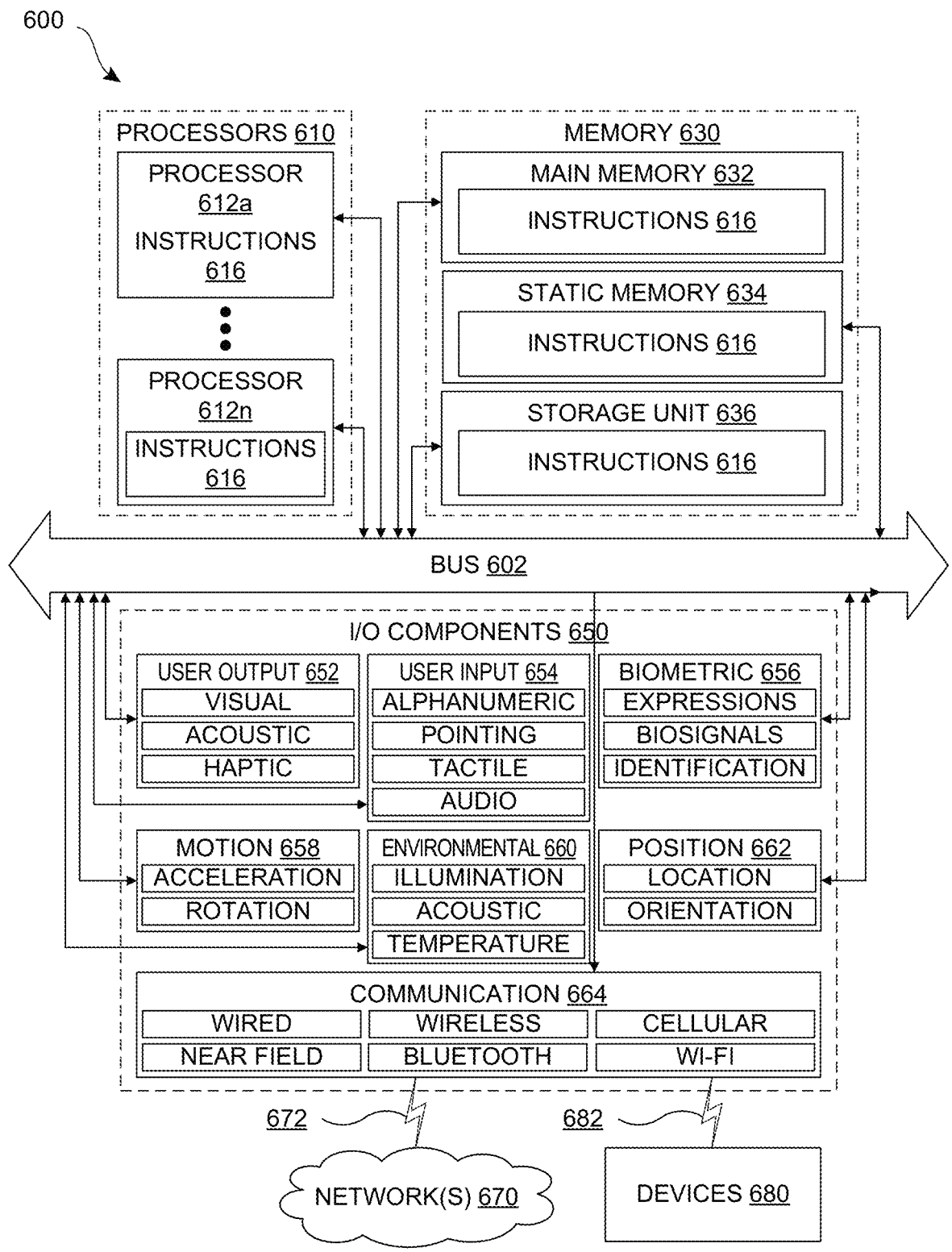
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
receiving a comment related to a content segment;
receiving data associated with the comment, the data including at least one of an identifier for the content segment to which the comment relates, an identifier for a user generating the comment, and a time at which the comment was generated;
generating display data for displaying the comment in a comment capsule; and
transmitting the display data for displaying the comment capsule in a user interface screen associated with the content segment,
wherein:
the comment capsule is displayed on the user interface screen inline with the content segment, and
an appearance of the comment capsule is dynamically changeable based on at least one of a number of comments received for the content segment, a size of the content segment, and a read status of the comment.

Item 2. The data processing system of item 1, wherein the comment capsule is displayed below the content segment.

Item 3. The data processing system of any of items 1 or 2, wherein the comment capsule displays an indicator that identifies the user.

Item 4. The data processing system of item 3, wherein the indicator is an image associated with the user.

Item 5. The data processing system of any preceding item, wherein the memory comprises executable instructions that, when executed by processor, further cause the data processing system to perform functions:
determining that the comment has not been viewed by the user for whom the comment capsule is being displayed;
generating an indicator showing that the comment is new for the user; and
displaying the indicator on the comment capsule.

Item 6. The data processing system of any preceding item, wherein the comment capsule displays a first few characters of the comment.

Item 7. The data processing system of any preceding item, wherein the memory comprises executable instructions that, when executed by processor, further cause the data processing system to perform functions of:
determining that the comment is a reply to a previous comment; and
displaying the comment capsule below another comment capsule associated with the previous comment.

Item 8. The data processing system of item 7, wherein the other comment capsule associated with the previous comment displays a first indicator that identifies the user and a second indicator that identifies a person who submitted the previous comment.

Item 9. The data processing system of any preceding item, wherein the content segment is associated with a plurality of comments, each of the plurality of comments being is displayed with one of a plurality of comment capsules and the user interface screen includes a first user interface element for collapsing the plurality of comment capsules and a second user interface element for expanding the plurality of comment capsules.

Item 10. A method for generating a comment capsule for a content segment comprising:
  receiving the comment related to the content segment;
  receiving data associated with the comment, the data including at least one of an identifier for the content segment to which the comment relates, an identifier for a user generating the comment, and a time at which the comment was generated;
  generating display data for displaying the comment in a comment capsule; and transmitting the display data for displaying the comment capsule in a user interface screen associated with the content segment,
  wherein:
    the comment capsule is displayed on the user interface screen inline with the content segment, and
    an appearance of the comment capsule is dynamically changeable based on at least one of a number of comments received for the content segment, a size of the content segment, and a read status of the comment.

Item 11. The method of item 10, wherein the comment capsule is displayed below the content segment.

Item 12. The method of any of items 10 or 11, wherein the comment capsule displays an indicator that identifies the user.

Item 13. The method of any of items 10-12, further comprising:
  determining that the comment has not been viewed by the user for whom the comment capsule is being displayed;
  generating an indicator showing that the comment is new for the user; and
  displaying the indicator on the comment capsule.

Item 14. The method of any of items 10-13, wherein the comment capsule displays a first few characters of the comment.

Item 15. The method of any of items 10-14, further comprising:
  determining that the comment is a reply to a previous comment; and
  displaying the comment capsule below another comment capsule associated with the previous comment.

Item 16. The method of item 15, wherein the other comment capsule associated with the previous comment displays a first indicator that identifies the user and a second indicator that identifies a person who submitted the previous comment.

Item 17. The method of any of items 10-16, wherein the content segment is associated with a plurality of comments, each of which is displayed with one of a plurality of comment capsules and the user interface screen includes a first user interface element for collapsing the plurality of comment capsules and a second user interface element for expanding the plurality of comment capsules.

Item 18. The method of item 17, wherein an order for the plurality of comment capsules is determined based on a relevance of each comment capsule to a viewer of the plurality of comments.

Item 19. A non-transitory computer readable medium on which are stored instructions that, when executed, cause a programmable device to perform functions of:
  receiving a comment related to a content segment;
  receiving data associated with the comment, the data including at least one of an identifier for the content segment to which the comment relates, an identifier for a user generating the comment, and a time at which the comment was generated;
  generating display data for displaying the comment in a comment capsule; and
  transmitting the display data for displaying the comment capsule in a user interface screen associated with the content segment,
  wherein:
    the comment capsule is displayed on the user interface screen inline with the content segment, and
    an appearance of the comment capsule is dynamically changeable based on at least one of a number of comments received for the content segment, a size of the content segment, and a read status of the comment.

Item 20. The non-transitory computer readable medium of item 19, wherein the instructions, when executed, further cause the programmable device to perform functions of:
  determining that the comment has not been viewed by the user for whom the comment capsule is being displayed;
  generating an indicator showing that the comment is new for the user; and
  displaying the indicator on the comment capsule.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor, cause the data processing system to perform functions of:
   receiving a comment related to a content segment;
   receiving data associated with the comment, the data including at least one of an identifier for the content segment to which the comment relates, an identifier for a user generating the comment, and a time at which the comment was generated;
   generating display data for displaying the comment in a comment capsule; and
   transmitting the display data for displaying the comment capsule in a user interface screen associated with the content segment, the comment capsule being displayed on the user interface screen inline with the content segment; and
   dynamically changing an appearance of the comment capsule based on adding content to or removing content from the content segment.

2. The data processing system of claim 1, wherein the comment capsule is displayed below the content segment.

3. The data processing system of claim 1, wherein the comment capsule displays an indicator that identifies the user.

4. The data processing system of claim 3, wherein the indicator is an image associated with the user.

5. The data processing system of claim 1, wherein the memory comprises executable instructions that, when executed by processor, further cause the data processing system to perform functions of:
   determining that the comment has not been viewed by the user for whom the comment capsule is being displayed;
   generating an indicator showing that the comment is new for the user; and
   displaying the indicator on the comment capsule.

6. The data processing system of claim 1, wherein the comment capsule displays a preview of the comment.

7. The data processing system of claim 1, wherein the memory comprises executable instructions that, when executed by processor, further cause the data processing system to perform functions of:
   determining that the comment is a reply to a previous comment; and
   displaying the comment capsule below another comment capsule associated with the previous comment.

8. The data processing system of claim 7, wherein the other comment capsule associated with the previous comment displays a first indicator that identifies the user and a second indicator that identifies a person who submitted the previous comment.

9. The data processing system of claim 1, wherein the content segment is associated with a plurality of comments, each of the plurality of comments is displayed with one of a plurality of comment capsules and the user interface screen includes a first user interface element for collapsing the plurality of comment capsules and a second user interface element for expanding the plurality of comment capsules.

10. A method for generating a comment capsule for a content segment comprising:
    receiving the comment related to the content segment;
    receiving data associated with the comment, the data including at least one of an identifier for the content segment to which the comment relates, an identifier for a user generating the comment, and a time at which the comment was generated;
    generating display data for displaying the comment in a comment capsule; and
    transmitting the display data for displaying the comment capsule in a user interface screen associated with the content segment, the comment capsule being displayed on the user interface screen inline with the content segment; and
    dynamically changing an appearance of the comment capsule based on adding content to or removing content from the content segment.

11. The method of claim 10, wherein the comment capsule is displayed below the content segment.

12. The method of claim 10, wherein the comment capsule displays an indicator that identifies the user.

13. The method of claim 10, further comprising:
    determining that the comment has not been viewed by the user for whom the comment capsule is being displayed;
    generating an indicator showing that the comment is new for the user; and
    displaying the indicator on the comment capsule.

14. The method of claim 10, wherein the comment capsule displays a preview of the comment.

15. The method of claim 10, further comprising:
    determining that the comment is a reply to a previous comment; and
    displaying the comment capsule below another comment capsule associated with the previous comment.

16. The method of claim 15, wherein the other comment capsule associated with the previous comment displays a first indicator that identifies the user and a second indicator that identifies a person who submitted the previous comment.

17. The method of claim 10, wherein the content segment is associated with a plurality of comments, each of which is displayed with one of a plurality of comment capsules and the user interface screen includes a first user interface element for collapsing the plurality of comment capsules and a second user interface element for expanding the plurality of comment capsules.

18. The method of claim 17, wherein an order for the plurality of comment capsules is determined based on a relevance of each comment capsule to a viewer of the plurality of comments.

19. A non-transitory computer readable medium on which are stored instructions that, when executed, cause a programmable device to perform functions of:

receiving a comment related to a content segment;

receiving data associated with the comment, the data including at least one of an identifier for the content segment to which the comment relates, an identifier for a user generating the comment, and a time at which the comment was generated;

generating display data for displaying the comment in a comment capsule; and transmitting the display data for displaying the comment capsule in a user interface screen associated with the content segment, the comment capsule being displayed on the user interface screen inline with the content segment; and dynamically changing an appearance of the comment capsule based on adding content to or removing content from the content segment.

20. The non-transitory computer readable medium of claim 19, wherein the instructions, when executed, further cause the programmable device to perform functions of:

determining that the comment has not been viewed by the user for whom the comment capsule is being displayed;

generating an indicator showing that the comment is new for the user; and displaying the indicator on the comment capsule.

* * * * *